(12) United States Patent
Hentschel et al.

(10) Patent No.: US 8,056,984 B2
(45) Date of Patent: Nov. 15, 2011

(54) HEAD REST CARRYING ELEMENT

(76) Inventors: Stephan Hentschel, Attendorn (DE);
Peter Finge, Attendorn (DE); Georg Mintkewitz, Atzelgift (DE); Andreas Rinsdorf, Freudenberg (DE)

( * ) Notice: Subject to any disclaimer, the term of this patent is extended or adjusted under 35 U.S.C. 154(b) by 449 days.

(21) Appl. No.: 12/218,700

(22) Filed: Jul. 17, 2008

(65) Prior Publication Data
US 2009/0021069 A1    Jan. 22, 2009

(30) Foreign Application Priority Data
Jul. 17, 2007  (DE) .......................... 10 2007 033 604

(51) Int. Cl.
*B60N 2/48*    (2006.01)
(52) U.S. Cl. .................................. 297/410; 297/452.18

(58) Field of Classification Search ................... 297/391, 297/410, 452.18
See application file for complete search history.

(56) References Cited

U.S. PATENT DOCUMENTS

| | | | | |
|---|---|---|---|---|
| 4,483,565 A * | 11/1984 | Terui et al. | ..................... | 297/410 |
| 6,364,415 B1 * | 4/2002 | Mori et al. | ..................... | 297/410 |
| 6,823,575 B2 * | 11/2004 | Petersen | ......................... | 29/509 |
| 7,121,626 B2 * | 10/2006 | Akehi et al. | ................... | 297/410 |
| 7,410,219 B2 * | 8/2008 | Kraft et al. | ..................... | 297/410 |

* cited by examiner

*Primary Examiner* — Peter R. Brown
(74) *Attorney, Agent, or Firm* — Douglas C. Wyatt

(57) ABSTRACT

The invention relates to a head rest carrying element which is produced out of a tubular member and which, can be connected to a seat at one end, and which carries a head rest at its second end. The tubular member is produced by being formed out of a flexibly rolled strip material with a variable wall thickness. Furthermore, the invention relates to a process of producing such a head rest carrying element.

6 Claims, 9 Drawing Sheets

Fig 4
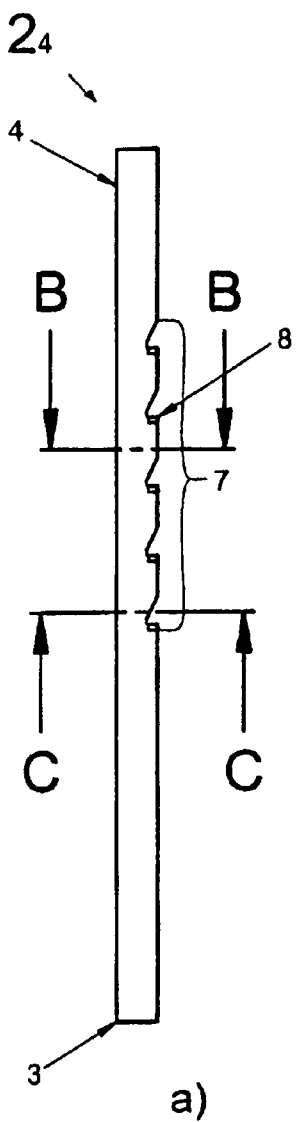
a)
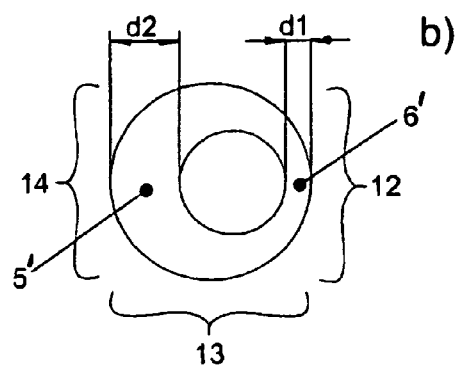
b)
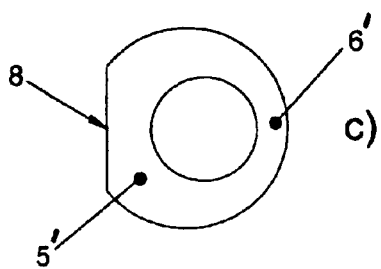
c)
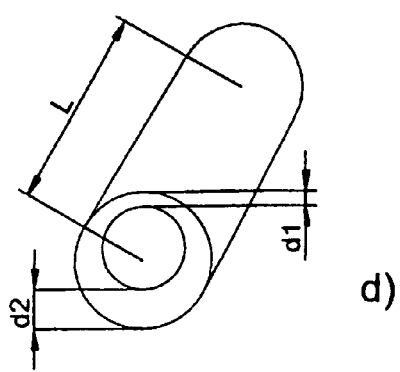
d)

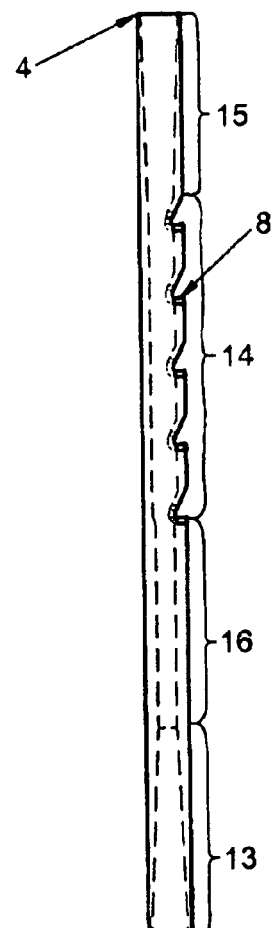
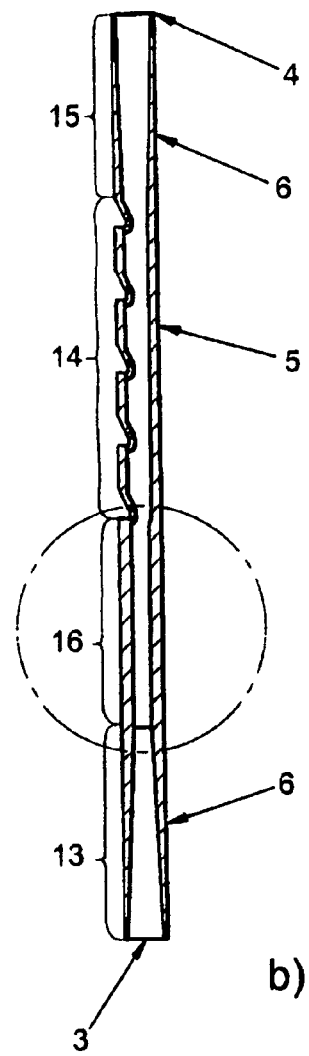
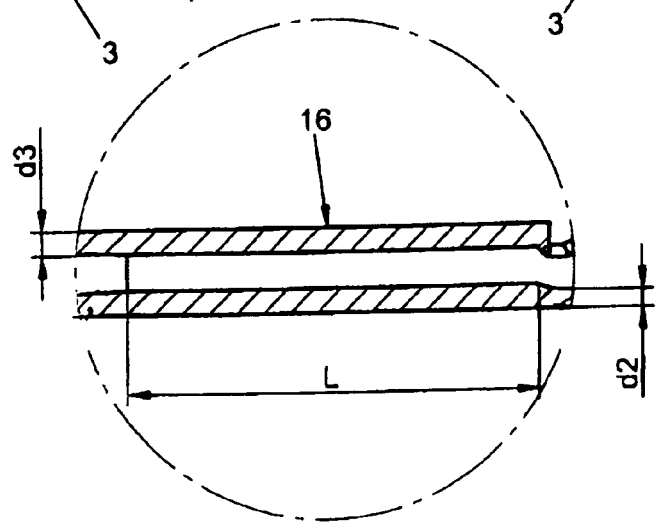
Fig 7

HEAD REST CARRYING ELEMENT

BACKGROUND OF THE INVENTION

The invention relates to a head rest carrying element for connecting a head rest to a seat, more particularly to a motor vehicle seat.

From DE 297 17 568 U1 there is already known a frame for motor vehicle head rests which is produced from a formed tubular piece consisting of light metal.

EP 0 916 549 B1 proposes a head rest for motor vehicle seats, which head rest comprises padding in which there is received a frame. The head rest is held by a pair of bars, with the height of the frame of the head rest being adjustable relative to the bars. The bars are connected to the back rest of the motor vehicle seat.

From EP 1 481 743 A2, it is known to use flexibly rolled strip material whose thicknesses vary in the longitudinal direction of the strip to produce a sheet metal element and to form this into a tubular member with an out-of-round cross-section. By carrying out a forming operation in the longitudinal direction of the strip, it is possible to produce a tubular member whose wall thickness varies along its length or, by carrying out a forming operation transversely to the longitudinal direction of the strip, to produce a tubular member whose wall thickness varies around the circumference.

DE 102 10 156 A1 describes a process of producing a tube which comprises a plurality of tube portions whose wall thicknesses differ from one another. The process comprises the following process stages: forming a sheet metal piece with a non-uniform thickness profile into tubular member and welding this into a tube. A tube produced in this way can be used as a roll bar for a motor vehicle.

From DE 603 07 484 T2 there is known a tool which serves to stamp notches into the tube of a head rest.

SUMMARY OF THE INVENTION

In order to minimise fuel consumption, reducing the weight of motor vehicle components is of paramount importance without, however, reducing the strength of a component. The mechanical load on a head rest frame is not the same everywhere. The limits for the wall thickness of head rests produced from tubular parts are derived from the criteria for passing a crash test, which criteria typically have to be observed.

It is an object of the present invention to provide a head rest carrying element for connecting a head rest to a seat, more particularly a motor vehicle seat, which head rest carrying element can be provided having low weight and good strength properties and which can be produced cost-effectively. A further objective consists in providing a process of producing such a head rest carrying element.

One solution according to the invention comprises providing a head rest carrying element produced from a tubular member which, at a first end, is connectable to a seat and which, at its second end, is connectable to a head rest for carrying the head rest. The tubular member can be produced by being formed out of a flexibly rolled strip material with a variable wall thickness.

An advantage of the inventive head rest carrying element is an optimization with respect to its weight and the anticipated occurring loads. The head rest carrying element comprises at least one first wall region with a greater wall thickness which, more particularly, can be subjected to a higher load, as well as at least one second wall region with a smaller wall thickness which, more particularly, can be subjected to a lower load. This measure achieves two advantages: on the one hand, the wall thickness can be adapted to a specific load applied to the component, i.e. the distribution of wall thickness is optimised in respect of the loads occurring in the case of a crash, as a result of which the safety of the vehicle passengers is improved. On the other hand, the overall weight of the head rest carrying element can be reduced because the second regions which are subjected to lower load can be produced with a thinner wall thickness. The wall thickness can be variable along the length and around the circumference or in the longitudinal and circumferential aspects of the tubular member.

For producing a tubular member whose wall thickness varies around its circumference, the semi-finished product used is preferably a sheet metal element comprising flexibly rolled strip material whose wall thickness varies across the longitudinal direction of the strip and which is deformed around the longitudinal direction of the strip. The semi-finished product produced from flexibly rolled strip material can also be referred to as a Tailor Rolled Blank (TRB).

For producing a tubular member whose wall thickness varies along its length and around its circumference, the semi-finished product used is preferably a sheet metal element comprising flexibly rolled strip material whose wall thickness varies in the longitudinal direction of the strip and which can be deformed around the longitudinal direction of the strip. For producing the semi-finished product, which can also be referred to as Tailor Rolled Strip (TRS), the strip material can be deformed by roller profiling in the longitudinal direction of the strip.

For producing a tubular member whose wall thickness varies along its length and around its circumference, the strip material can be flexibly rolled successively in the longitudinal and the transverse direction.

Independent of the type of production of the semi-finished product, the tubular member used as the starting material for the head rest carrying element can be preferably provided with a closed cross-section, being welded in the longitudinal direction after the forming operation.

For fixing or engaging the head rest carrying element with the seat or the head rest, a holding device can be provided comprising a plurality of engagement recesses along its length, with the engagement recesses preferably being arranged in a wall region with a greater wall thickness. This is advantageous in that the tubular member is prevented from tearing during the production of the engagement recesses. Furthermore, the increased wall thickness provides an improvement in the dimensional accuracy of the engagement recesses. This, in turn, can provide that the force required for inserting the head rest is increased, and thereby provide passenger safety in the case of a crash. An advantage of providing the wall regions with a reduced wall thickness includes a reduction in the weight of the head rest carrying element. It is possible for one single row of engagement recesses to be worked into one side of the head rest carrying element. It is also possible to produce two rows of engagement recesses on different sides of the head rest carrying element. The engagement recesses of one row are preferably uniformly distributed one behind the other.

According to a first embodiment, the first wall region with a greater wall thickness comprises a first longitudinal portion, more particularly a cylindrical portion. The second region with a smaller wall thickness preferably comprises a second longitudinal portion, more particularly a cylindrical portion. Between the two portions, the head rest carrying element comprises a transition portion whose cross-section varies along its length and, more particularly, changes continuously.

Between the free end of the head rest carrying element and the first longitudinal portion with the increased wall thickness, there can be formed a further cylindrical portion whose cross-section is constant along its length. The inventive head rest carrying element with variable wall regions is particularly advantageous in respect of passenger safety. In the wall regions subjected to a higher load, more particularly above the region where the carrying element is clamped in, the wall thickness can be increased relative to other regions. In this way, the risk of injuries in the case of a crash can be reduced. In the case of a first embodiment whose cross-section varies along its length, the tubular member preferably comprises a constant wall thickness around its circumference.

According to a second embodiment, at least the first wall region with a greater wall thickness—in a cross-sectional view—is formed in a first circumferential portion of the tubular member, which, in the circumferential direction, is adjoined by a second circumferential region with a smaller wall thickness. The engagement recesses are preferably located in the first circumferential region with a greater wall thickness. In a preferred embodiment, the head rest carrying element, at least along the partial length of engagement recesses, comprises a circular cylindrical inner face and a circular cylindrical outer face offset eccentrically relative thereto. However, it is also conceivable to provide an embodiment wherein the inner face is circularly cylindrical in cross-section and the outer face comprises an oval cross-section. This can be particularly advantageous where the head rest carrying element is provided with two circumferentially offset rows of engagement recesses. According to a preferred embodiment, the tubular member, along its entire length, comprises a constant cross-section. This results in particularly advantageous production conditions.

According to a third embodiment—as combination of the first and the second embodiments—it is proposed that the wall thickness of the head rest carrying element produced from the tubular member is variable both in the longitudinal direction and in the circumferential direction. This measure allows a maximum amount of flexibility as regards material distribution, so that the wall thickness can be adapted to load conditions in an optimum way while achieving a reduction in weight at the same time.

According to a preferred embodiment which applies to all the above-mentioned embodiments, the wall thickness of the first wall regions of the tubular member with the increased wall thickness can be provided as approximately 1.5 mm to 2.5 mm in thickness and, more particularly, can be provided as approximately 2 mm in thickness. Furthermore, the second regions of the tubular member with the reduced wall thickness preferably comprise a wall thickness of 0.7 to 1.3 mm and, more particularly can be provided to be approximately 1.0 mm in thickness. This design increases the stiffness in critical regions while minimizing weight by reducing wall thickness in regions subjected to lower loads.

The head rest carrying element can be provided as U-shaped, L-shaped or I-shaped, among other things. The U-shaped or L-shaped head rest carrying elements can each comprise two arms to allow fixing relative to the seat. The arms can be connected to one another by a connecting web to which the head rest can be fixed. In these embodiments, both arms can comprise thickened wall regions, i.e. they comprise a symmetrical design which is easy to achieve from a production-technical point of view. However, it is also possible for only one of the two arms to comprise a thickened wall region, i.e. to comprise an asymmetrical design wherein the weight can be reduced further. The I-shaped head rest supporting element can be provided in the form of an engagement bar, with two parallel engagement bars forming a pair in order to jointly carry a head rest. Of these, either one or even both can comprise a variable wall thickness in accordance with the invention. In the case of the engagement bars, the height is preferably adjusted relative to the head rest, i.e. the pair of engagement bars which jointly carry a head rest, can be fixed relative to the seat, with the height of the head rest being adjustable relative to the engagement bars.

Furthermore, the above-mentioned objective can be achieved by providing a process of producing the head rest carrying element according to one of the above embodiments, comprising the following process stages: producing a sheet metal element out of a flexibly rolled strip material with a variable wall thickness; and forming the sheet metal element into a tubular member, wherein there are formed first wall regions with a greater wall thickness and second wall regions with a smaller wall thickness.

According to a first process for producing said semi-finished product, a flexibly rolled strip material can be used whose wall thickness is variable in the longitudinal direction of the strip (TRB). By subsequently deforming the strip material around the longitudinal direction of the strip, a tubular member whose wall thickness is variable along the length of the tubular member can be produced.

According to a second process for producing said semi-finished product, a flexibly rolled strip material can be used whose wall thickness is variable in the direction extending transversely to the longitudinal direction of the strip (TRB). By subsequently deforming the strip material around the longitudinal direction of the strip, a tubular member whose wall thickness is variable around the circumference of the tubular member can be produced.

According to a third process, the strip material is first flexibly rolled in the longitudinal direction and then in the transverse direction. Independently of the production of the semi-finished product, the free edges of the deformed strip material are preferably welded along the length, so that a closed cross-section can be achieved.

According to a preferred embodiment, a further process stage can be provided wherein engagement recesses can be worked into the tubular member, preferably into the wall regions having greater wall thickness. The engagement recesses are preferably worked into the tubular member by a non-chip-producing forming operation, with chip-forming production methods not being excluded. For the non-chip forming production process, partial stages can be provided, including introducing an inner mandrel into the tubular member, with the inner mandrel comprising at least one side recess; pressing the tube wall into the at least one recess of the inner mandrel, with at least one engagement recess being formed inwardly into the tube wall; rotating the inner mandrel around its longitudinal axis until the at least one engagement recess is disengaged from the at least one recess of the inner mandrel. Thereafter, the inner mandrel can again be axially withdrawn from the tubular member. For non-chip forming production methods, it is particularly important for the tubular element to comprise a circularly round inner cross-section, so that the inner mandrel can be rotated relative to the tubular element. After the engagement recesses have been worked in, they can be subsequently machined, for example by grinding.

Subsequently, the tubular member can be bent into the head rest carrying element, and the ends of the head rest carrying elements can be machined. Subsequently, a surface coating operation can be provided.

BRIEF DESCRIPTION OF THE DRAWINGS

Preferred embodiments will be explained below with reference to the drawings wherein

FIG. 4 illustrates an inventive head rest carrying element in a fourth embodiment
  a) in a side view,
  b) in a cross-section according to sectional line B-B of FIG. 1a,
  c) in a cross-section according to sectional line C-C of FIG. 1a, and
  d) partially in a perspective view.

FIG. 7 illustrates an inventive head rest carrying element in a seventh embodiment
  a) in a side view,
  b) in a longitudinal section, and
  c) partially in the longitudinal section.

DETAILED DESCRIPTION

Figure 1:
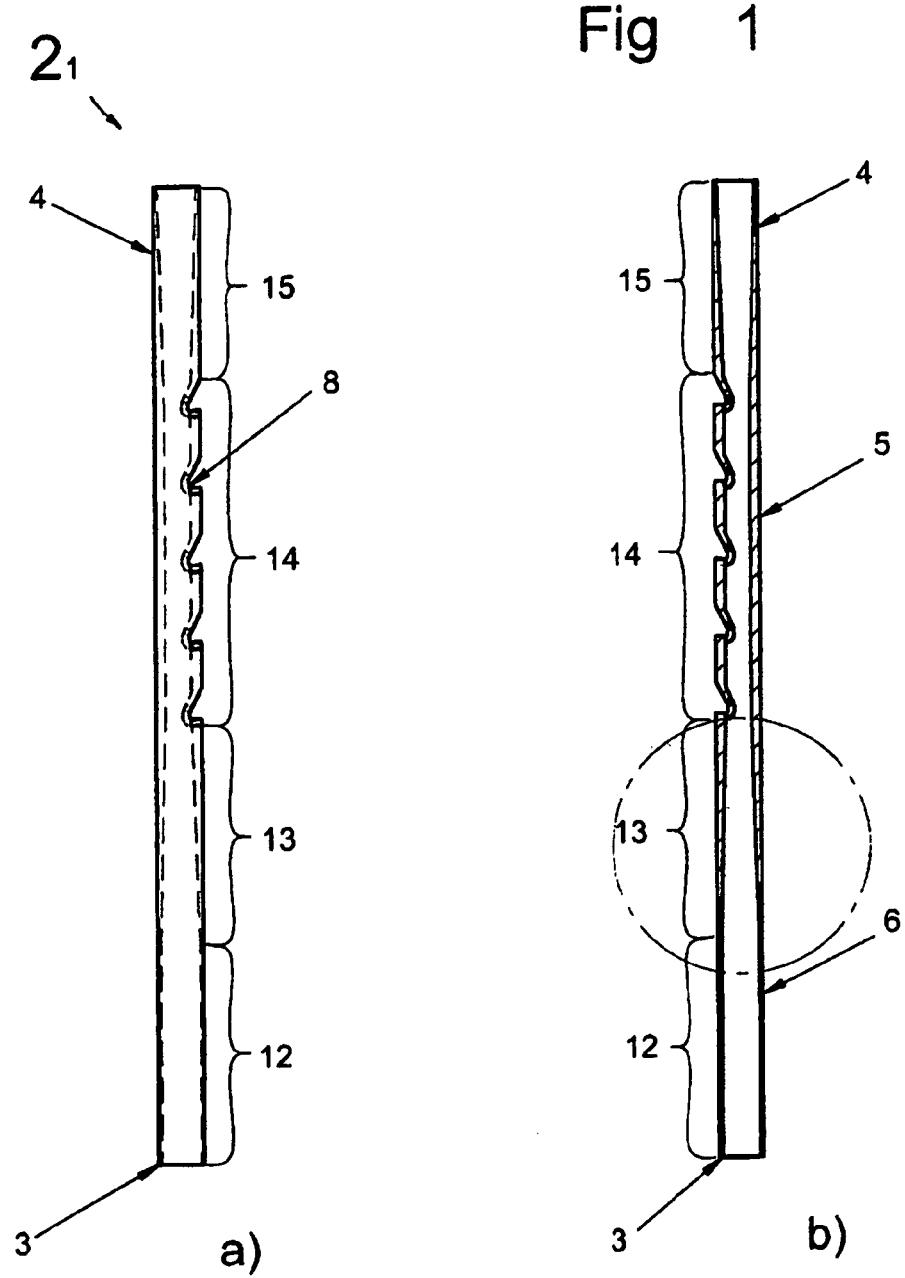
FIG. 1 illustrates an inventive head rest carrying element in a first embodiment
  a) in a side view,
  b) in a longitudinal section, and
  c) partially in the longitudinal section.
Figure 2:
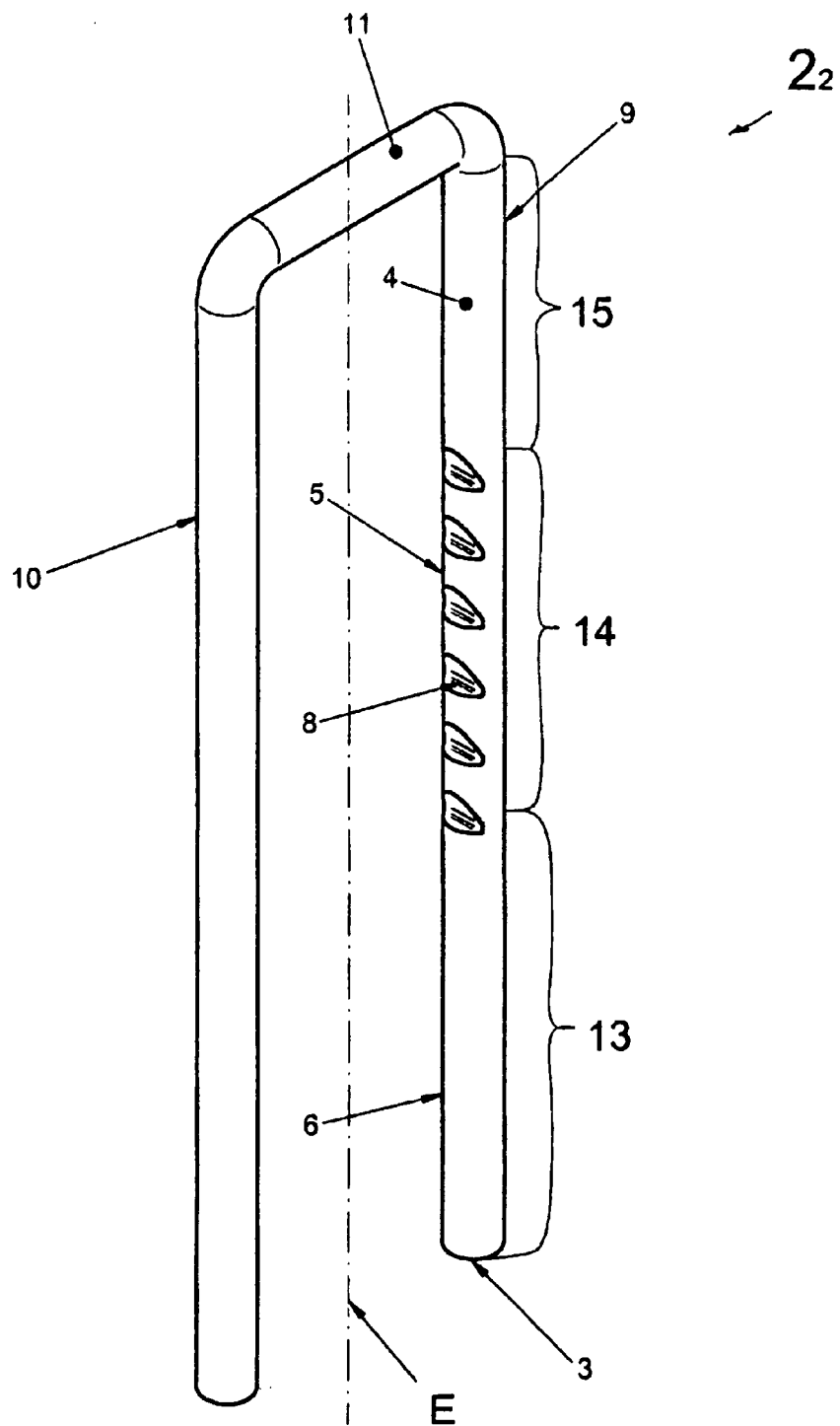
FIG. 2 illustrates an inventive head rest carrying element in a second embodiment in a perspective view.
Figure 3:
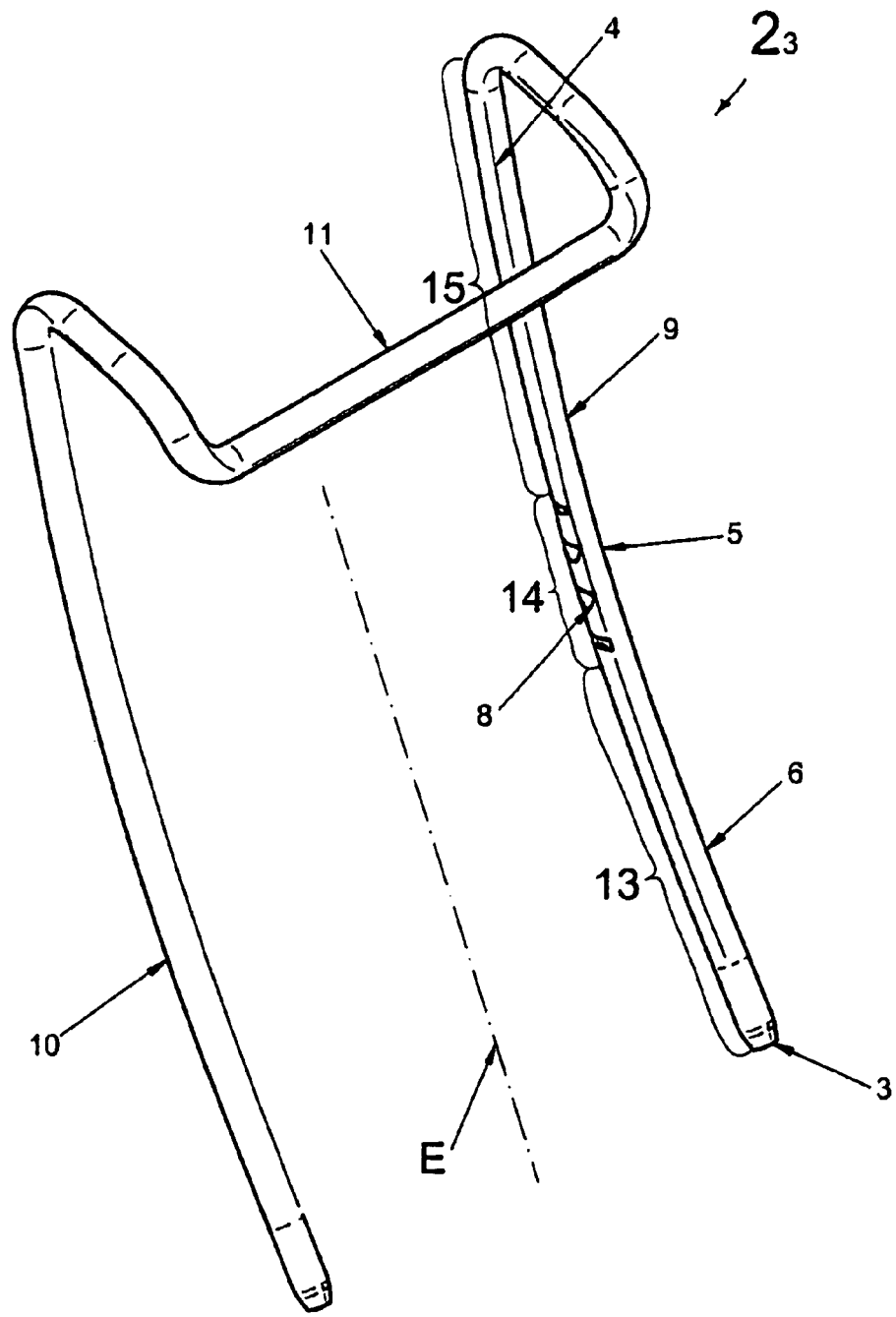
FIG. 3 illustrates an inventive head rest carrying element in a third embodiment in a perspective view.
Figure 5:
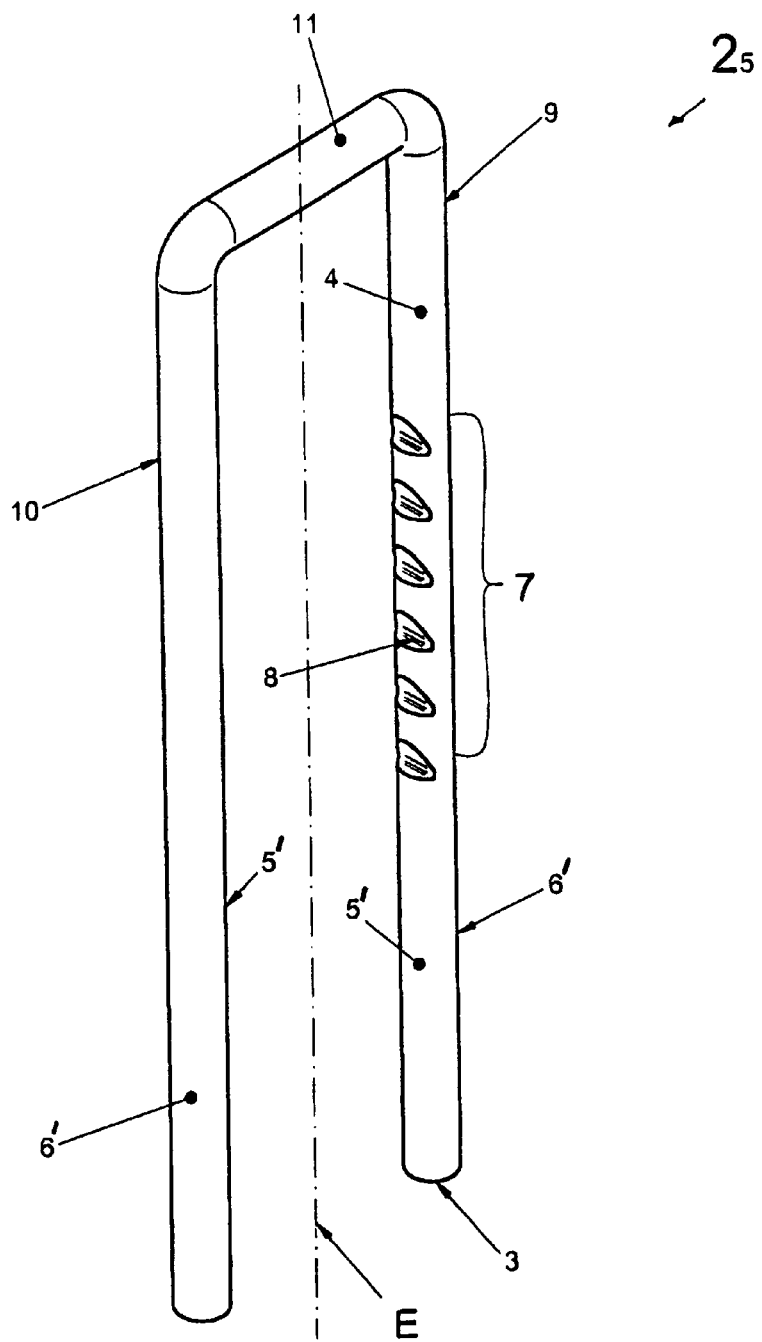
FIG. 5 illustrates an inventive head rest carrying element in a fifth embodiment in a perspective view.
Figure 6:
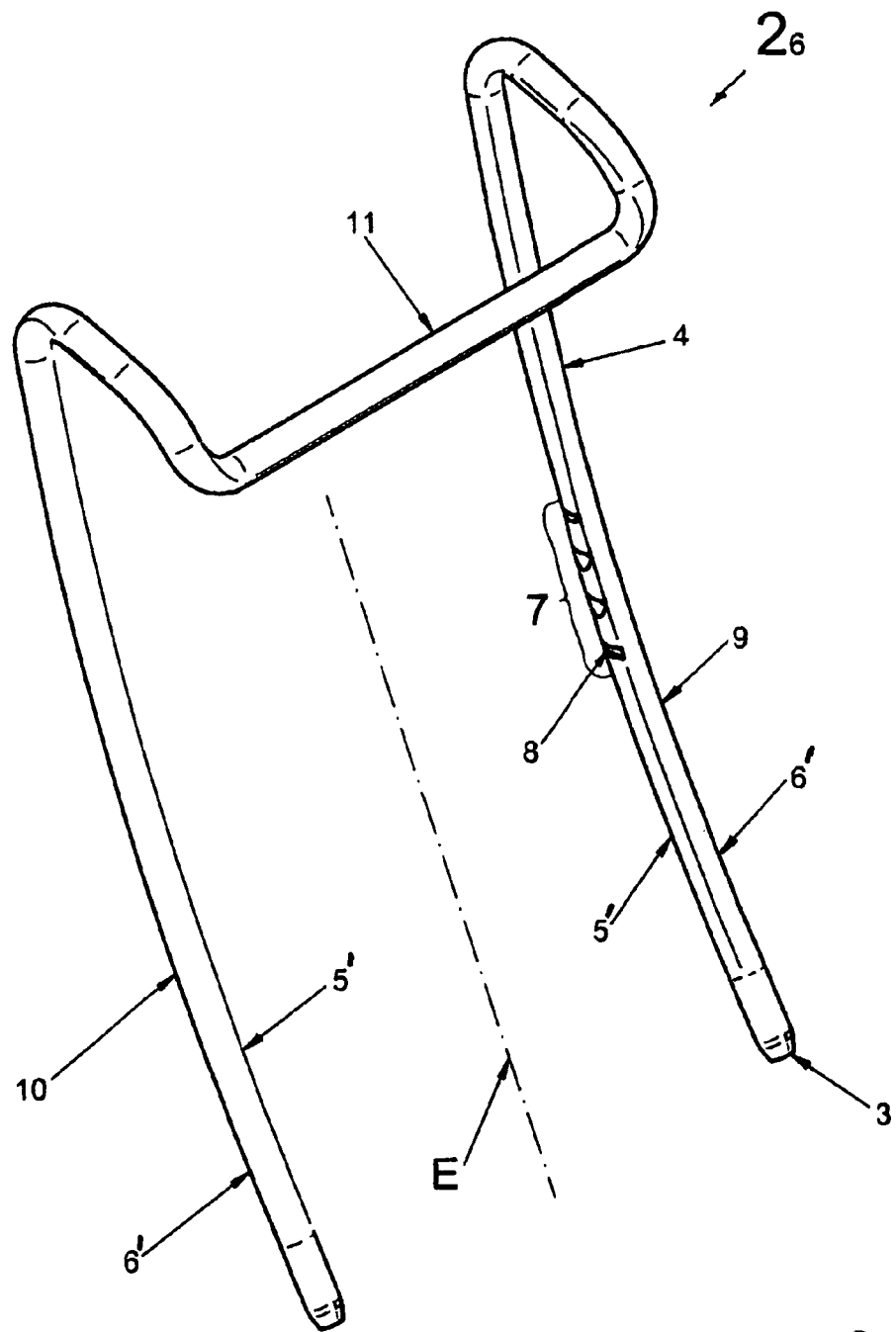
FIG. 6 illustrates an inventive head rest carrying element in a sixth embodiment in a perspective view.

FIGS. 1-6 will initially be described jointly as far as their corresponding characteristics are concerned. A head rest carrying element 2 is provided which can be produced from a tubular member. The heat rest carrying element 2 can be provided with a lower first end 3 which can be introduced into a holding device (not shown) for providing a connection with a seat and which, on the other hand, can carry a head rest (not shown). The tubular member serving as the starting material can be produced from a flexibly rolled strip material by a forming operation; whereby its wall thickness is variable in the longitudinal direction of the strip. The tubular member can be provided with a closed cross-section, with the free edges of the sheet metal element formed into the tubular member being welded together along their length. The head rest carrying element 2 can comprise at least one first wall region 5 with a greater wall thickness d2 which can be subjected to a higher load, as well as at least one second wall region 6 with a smaller wall thickness D1 which can be subjected to a lower load. The first and the second wall regions 5, 6 can extend in the longitudinal direction of the head rest carrying element, having a constant wall thickness around their cross-sections (FIGS. 1 to 3). However, the first and second wall regions 5', 6' can call extend in the circumferential direction of the tubular head rest carrying element, having a constant cross-section along their length (FIGS. 4-6). However, it is also possible to provide embodiments wherein the head rest carrying element comprises a variable wall thickness in the longitudinal direction and in the circumferential direction (not shown.)

The supporting elements 2 shown in FIGS. 1 to 3 are first described jointly in respect to their corresponding characteristics. The supporting elements 2 can be produced out of a tubular member, preferably by deforming the strip material of a Tailor Rolled Blank in the longitudinal direction of the strip, so that the wall thickness is variable along the length of the tubular member. The head rest carrying element 2 can comprise several axially adjoining longitudinal portions with different wall thicknesses d1, d2. The wall thickness—if seen in a cross-sectional view through the head rest carrying element—can be constant around the circumference. Along the axial extension in which there are provided the engagement recesses 8, a first wall region 5 can be formed with a greater wall thickness d2, whereas adjoining thereto, there are formed two wall regions 6 with a smaller wall thickness d1. This measure ensures that, in the region of the head rest carrying element 2 subjected to higher loads, greater stiffness and strength can be provided. Thus, the requirements for passing crash tests can be complied with. Furthermore, the increased wall thickness can ensure greater precision when working in the engagement recesses 8 and thus a higher degree of dimensional accuracy. In this way, it can be ensured that the threshold force required for introducing the head rest can be reached thereby increasing passenger safety in the case of a crash.

Below, the additional features of the different embodiments according to FIGS. 1 to 3 will be explained.

The head rest carrying element $2_1$ can be provided in the form of a tubular engagement bar. Two such engagement bars can carry a head rest and connect the head rest to the seat, with the engagement bars, being fixed relative to a holding device (not shown). By means of their lower second ends, the upper second ends 4 of the engagement bars can carry the head rest. It is possible for only one of the two engagement bars $2_1$ to be provided with engagement recesses 8, but it is also possible for both engagement bars $2_1$ to be provided with engagement recesses 8. For the present embodiment with engagement bars it is proposed that the height of the head rest padding is adjustable relative engagement bars, and the engagement bars are fixed relative to the seat. To that extent, the inside of the head rest padding can be provided with holding elements which cooperate with the engagement recesses of the engagement bars. The cross-section of the tubular member serving as the starting material can be variable along the length L of the engagement bar. The head rest carrying element $2_1$ can comprise a cylindrical end portion 12 whose wall thickness d1 is constant and preferably amounts to 1 mm. The end portion 12 can be followed by a first transition portion 13 whose wall thickness continuously increases towards the first longitudinal portion 14 along its length until reaching a predetermined distance, such as approximately 2 mm. In addition, the inner face, can form a conical shape. The longitudinal portion 14 forms the first wall region 5 with an increased wall thickness in which there are provided engagement recesses 8. Above the first longitudinal portion 14, the wall thickness is again continuously reduced in a further transition region 15 until a wall thickness d1 of 1 mm has been reached, for example.

The head rest carrying element $2_2$, as shown in FIG. 2, largely corresponds to that illustrated in FIG. 1, with identical details having been given the same reference numbers. To that extent, reference is made to the above description. In addition, the present head rest carrying element can be provided in the form of a U-shaped frame which comprises two approximately parallel arms 9, 10 as well as a connecting web 11. The two arms 9, 10, can be inserted into a holding device of the seat by means of their lower second ends 3, whereas the head rest padding can be attached to the upper portion 4, 11 of the head rest frame. In the present embodiment, the head rest padding can be fixed relative to the head rest frame, whereas the height of the head rest frame can be adjustable relative to the seat. To that extent, inside the seat, holding elements can be provided which can cooperate with the engagement recesses 8 of the engagement bars. It can be seen that one of the arms 9, inside its longitudinal portion 14, can comprise engagement recesses 8, which are directed laterally inward, whereas the opposed arm 10 can be provided without corresponding engagement recesses. Between their free ends 3 and the longitudinal portion 14, the arms 9, 10 each can comprise a transition portion 13 inside which the wall thickness can increase continuously along the length. Underneath the lowermost engagement recess 8, the first longitudinal portion 14 can be provided which comprises a constant wall thickness of approximately 2 mm and which can end above the uppermost engagement recess 8. For example, above the longitudinal portion 14, the wall thickness can again be reduced continuously in a transition portion 15 from 2 mm to 1 mm. The connecting web 11 which connects the two arms 9, 10 to one another, can comprise a uniformly reduced wall thickness. The outer diameter of the head rest carrying element $2_2$ can be constant along the whole of its length, and changes in the wall thickness can take place inwardly. The head rest carrying element $2_2$ preferably comprises a circular outer cross-section and a circular inner cross-section. However, it is also possible for the outer cross-section to be oval in shape, wherein the change in wall thickness takes place towards the outside.

FIG. 3 shows a head rest carrying element $2_3$ in a further embodiment which largely corresponds to that shown in FIG. 2 and to the description of which reference is hereby made. The clamp-formed head rest carrying element $2_3$ can be approximately L-shaped in a side view. The head rest carrying elements $2_3$ can be used in countersinkable head rests which can be used for the rear seats of a motor vehicle. In the case of the present embodiment, the engagement recesses 8 can be provided in one arm 9 only, i.e. on the inside of an arm. The opposed arm 10 can be provided with a smooth outer face. The wall thicknesses along the length of the two arms 9, 10 can correspond relatively to those shown in FIG. 2.

The supporting elements 2 shown in FIGS. 4 to 6 can be produced out of a tubular member, preferably by deforming the material of a Tailor Rolled Strip in the longitudinal direction of the strip, so that the wall thickness is variable around the circumference of the tubular member. The first wall region 5' can comprise a first circumferential portion 14 with a greater thickness d2, and the second wall region 6' can comprise an opposed second circumferential wall portion 12 with a smaller wall thickness dl. In a cross-sectional view, the wall thickness can change continuously from the circumferential portion 12 with the smallest wall thickness dl to the circumferential portion 14 with the maximum wall thickness d2. In one embodiment, the maximum wall thickness d2 can be approximately 2 mm, whereas the minimum wall thickness dl can be approximately 1 mm, with these values being given by way of example only. The head rest carrying element 2 can comprise a first longitudinal portion 7 in which, on one side, engagement recesses 8 can be worked in one above the other and which can be provided to engage a corresponding holding device of the seat or head rest padding respectively. The engagement recesses 8 can be uniformly distributed along the length of the first longitudinal portion 7 and can be located in the first wall region 5' of the head rest carrying element 2 having increased wall thickness d2. The side region 6' of the head rest carrying element 2, which is positioned opposite the engagement recesses 8, can be optimized with respect to the anticipated loads, such as which may occur in the case of a crash, while the head rest carrying element 2, can be of a low weight. The tubular member serving as the starting material for the inventive head rest carrying element 2 can comprise a constant cross-section along its length, such as shown in FIG. 1*d*. Both the outer cross-section and the inner cross-section can be circular-cylindrical in shape. However, it is also possible for the outer cross-section to be provided as out-of-round in shape.

Whereas in the embodiments as illustrated, the head rest carrying elements 2 comprise, on one side only, a plurality of engagement recesses 8 arranged in one row one above the other, it is also possible to provide embodiments wherein corresponding engagement recesses can be provided on two opposed circumferential regions. In such a case, the wall thickness—if viewed in a cross-sectional view—can be increased in both circumferential regions by engagement recesses. In this case, the outer cross-section can be oval.

Below, a description of the special features of the different embodiments according to FIGS. 4 to 6 is provided.

The head rest carrying element $2_4$ shown in FIG. 4 can be provided in the form of a tubular engagement bar. Each two of such engagement bars can form a pair and jointly carry a head rest padding in order to connect the head rest to the seat. It is possible for only one of the two engagement bars $2_4$ to be provided with engagement recesses 8, but it is also possible for both engagement bars $2_4$ to be provided with engagement recesses 8. The cross-section of the tubular member used as the starting material can be constant along the length L of the engagement bar. As far as its outer shape is concerned, the head rest carrying element $2_4$ according to the present embodiment can correspond to that shown in FIG. 1, so that, as far as the joint characteristics are concerned, reference is made to the above description.

The head rest carrying element $2_5$, as illustrated in FIG. 5, can largely correspond to the head rest carrying element shown in FIG. 4, with identical details having been provided with the same reference numbers. To that extent, reference is made to the above description. In addition, an embodiment of a head rest carrying element can be provided in the form of a U-shaped frame which can comprise two approximately parallel arms 9, 10 and a connecting web 11 connecting same to one another. It can be seen that one of the arms 9, inside its longitudinal portion 7, can comprise laterally inwardly directed engagement recesses 8, whereas the opposed arm 10 can be provided without such engagement recesses. In this case too, the tubular member serving as the starting material can comprise a constant cross-section along its length. The circumferential region 5 with its greater wall thickness d2, with reference to the bend of the frame, can be arranged on the inside of the frame. In an embodiment of a head rest carrying elements wherein the engagement recesses are arranged on the outside of the frame, the greater wall thickness d2 are provided on the outside. With respect to the arresting action relative to the seat and head rest padding respectively, the present head rest carrying element $2_5$ corresponds to that shown in FIG. 2, so that, in this respect, reference can be made to the above description.

FIG. 6 shows a head rest carrying element $2_6$ in a further embodiment which largely corresponds to that illustrated in FIG. 5, to the description of which reference is hereby made. The clamp-formed head rest carrying element $2_6$ shown here, can be approximately L-shaped in a side view. The head rest carrying elements $2_6$ can be used in countersinkable head rests for the rear seats of a motor vehicle. In the case of the present embodiment, the engagement recesses 8 can be provided in one arm 9 only, i.e. on the inside. The opposed arm 10 can have a smooth outer surface.

The head rest carrying element $2_5$ illustrated in FIG. 7 can largely correspond to the head rest carrying element shown in FIG. 1, with identical details having been provided with the same reference numbers. To that extent, reference is made to the above description. In addition, in the present embodiment, a further longitudinal portion 16 can be provided underneath the first longitudinal portion 14, and can be approximately cylindrical in shape, comprising a wall thickness d3 which is again increased relative to the wall thickness d2. The thickened longitudinal portion 16 can be adjoined by a transition portion 13 whose wall thickness continuously decreases with the inner face towards the end 3, and which can be conical in shape. The additional longitudinal portion 16 having the maximum wall thickness d3 is advantageous in that it is possible for high loads occurring in the case of a crash to be accommodated, thereby reducing the risk of vehicle passengers being injured. The remaining head rest carrying elements according to FIGS. 2 to 6 can also be provided with an additionally increased wall thickness in regions subjected to high loads.

Figure 8B:
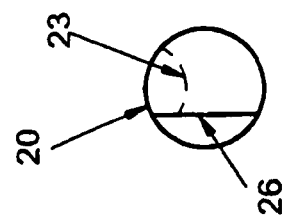
FIG. 8 is a diagrammatic illustration of a device for working engagement recesses into an inventive head rest carrying element during the working-in operation
  a) in a longitudinal section, and
  b) showing the mandrel according to FIG. 8a in an axial view.
Figure 8A:
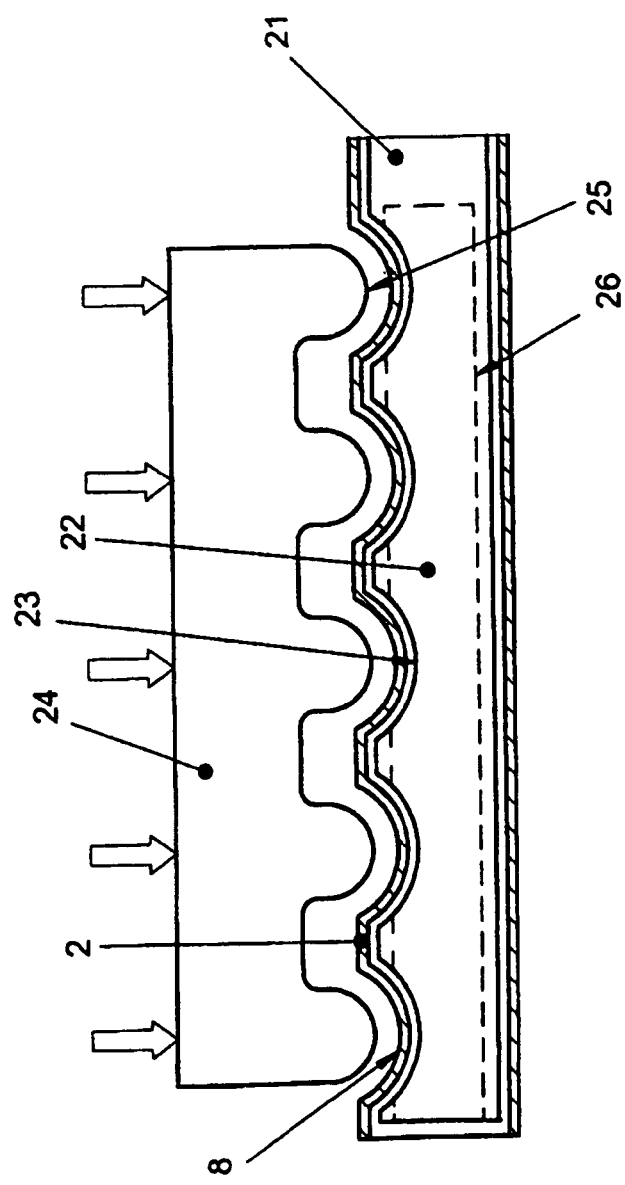
Figure 9A:
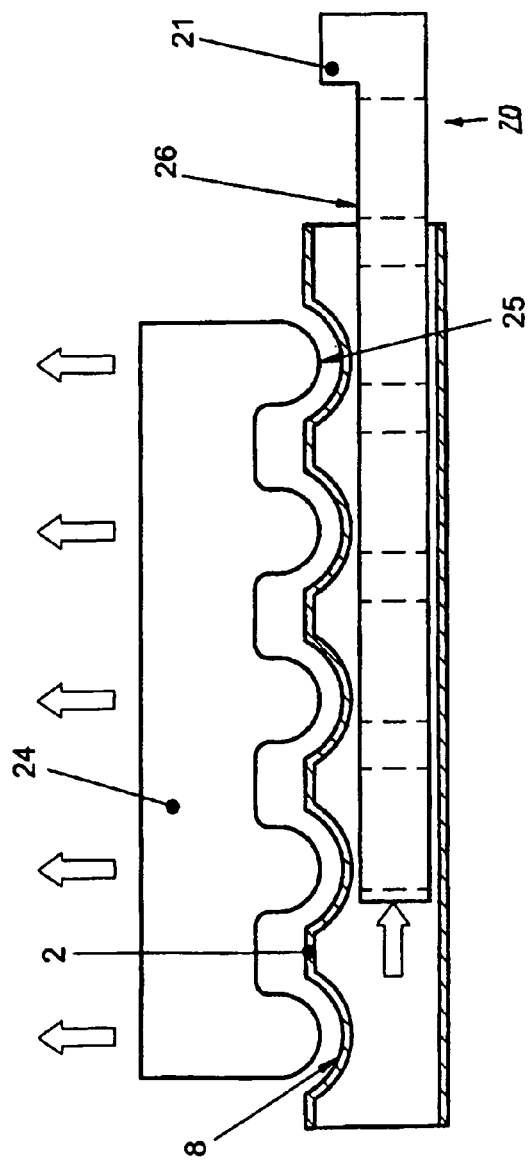
FIG. 9 illustrates the device according to FIG. 8 after the working-in process
  a) in a longitudinal section, and
  b) showing the mandrel in an axial view.
Figure 9B:
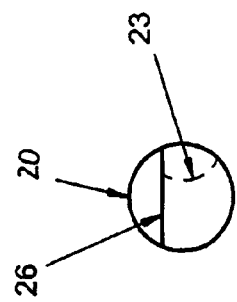

FIGS. 8 and 9 will be described jointly below. They diagrammatically show a device for producing engagement recesses 8 in a head rest carrying element 2. The individual process stages will be explained below.

After the tubular member has been produced as the starting material, an inner mandrel 20 can be introduced into the free end 3. The inner mandrel 20 can be a circular-cylindrical first portion 21 whose end is axially followed by a supporting portion 22 whose cross-section deviates from the circular shape. On its outer face, the supporting portion 22 can include indentations 23 whose number corresponds to the number of engagement recesses to be worked-in into the head rest carrying element 2, which indentations can serve to produce the engagement recesses 8.

In addition to the inner mandrel 20, the device for producing the engagement recesses comprises a punch 24 which can be provided with projections 25 whose number preferably corresponds to the number of engagement recesses to be produced. After the inner mandrel 20 has been slid into the supporting element 2, the punch 24 can be radially and inwardly loaded from the outside. In the course of this pressure applying operation (which is illustrated by arrows in FIG. 8a), the wall of the head rest carrying element 2 can be radially and inwardly pressed into the indentations 23 of the inner mandrel 20, so that the engagement recesses 8 can be formed and thus can obtain a defined contour.

The inner mandrel 20 can inwardly support the formed-in wall portion and thus ensure a defined plastic deformation while the engagement recesses 8 are being produced. Because a greater wall thickness d2 can be provided in the regions 5 of the engagement recesses 8, the production process of introducing the engagement recess can be more precise, so that the amount of work involved in subsequent treatments can be reduced. Furthermore, the improved dimensional accuracy of the engagement recesses improves passenger protection.

After the engagement recesses 8 have been formed, the punch 24 can be moved radially and outwardly and the inner mandrel 20 can be rotated relative to the head rest carrying element 2 until the indentations 23 are disengaged from the inwardly curved wall portions. The inner mandrel 20 can then be withdrawn from the head rest carrying element 2, such as illustrated in FIG. 9. The inner mandrel 20 can comprise a longitudinally extending flattened portion 26, which is illustrated in FIG. 8 by dashed lines, thereby permitting the mandrel to be rotated relative to the carrying element 2. The flattened portion 26 can be arranged so as to be offset relative to the indentations 23 by 90° in the circumferential direction, so that the inner mandrel 20 can be rotated by 90° and then withdrawn from the head rest carrying element 2 after the engagement recesses 8 have been formed.

After the engagement recesses 8 have been worked in, the tubular member can be bent into the inventive head rest carrying element 2 by a forming operation; for example into an engagement bar according to FIGS. 1, 4 or 7, or into a U-shaped frame according to FIGS. 2 or 5 or into an L-shaped frame according to FIGS. 3 or 6. Subsequently, the ends 3 of the head rest carrying element 2 can be machined, such as by providing with a chamfer. Finally, the head rest carrying element 2 can be surface-treated.

The invention claimed is:

1. A head rest carrying element comprising of a tubular member which, on the one hand, is connectable to a seat and which, on the other hand, is connectable to a head rest, wherein the tubular member is produced by being formed out of a flexibly rolled strip material with a variable wall thickness, wherein there is formed at least one first wall region comprising a first circumferential portion with a greater wall thickness and at least one second wall region comprising a second circumferential portion with a smaller wall thickness, and wherein in the first wall region with the greater wall thickness there are formed engagement recesses to permit the tubular member to be fixed relative to the seat.

2. A head rest carrying element according to claim 1, wherein,
in a cross-sectional view, the tube wall continuously changes in the circumferential direction from the first circumferential portion with a maximum wall thickness to the second circumferential portion with a minimum wall thickness.

3. A head rest carrying element according to claim 1, wherein
at least along a partial length in the region of the engagement recesses, the tubular member comprises a circular cylindrical inner face.

4. A head rest carrying element according to claim 1, wherein
the difference in wall thickness between the first wall region with the greater wall thickness and the second wall region with the smaller wall thickness ranges between 30% and 70% with reference to the maximum wall thickness.

5. A head rest carrying element according to claim 1, wherein it is provided in the form of an engagement bar which, jointly with a further engaging bar, carries the head rest.

6. A head rest carrying element according to claim 1, wherein it is provided in the form of a frame which comprises two arms and a connecting web connecting said two arms.

* * * * *